US012782248B2

(12) United States Patent
Yasojima et al.

(10) Patent No.: US 12,782,248 B2
(45) Date of Patent: Nov. 3, 2026

(54) INFECTIOUS DISEASE TESTING METHOD

(71) Applicant: SHIMADZU CORPORATION, Kyoto (JP)

(72) Inventors: Makoto Yasojima, Kyoto (JP); Hiroaki Takemori, Kyoto (JP); Fumi Daigo, Kyoto (JP); Takuya Tomono, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 479 days.

(21) Appl. No.: 18/279,339

(22) PCT Filed: Jun. 18, 2021

(86) PCT No.: PCT/JP2021/023270

§ 371 (c)(1),
(2) Date: Aug. 29, 2023

(87) PCT Pub. No.: WO2022/201567

PCT Pub. Date: Sep. 29, 2022

(65) Prior Publication Data

US 2024/0142350 A1 May 2, 2024

(30) Foreign Application Priority Data

Mar. 25, 2021 (JP) ................................ 2021-052117

(51) Int. Cl.
*G01N 1/20* (2006.01)

(52) U.S. Cl.
CPC ................................ *G01N 1/2035* (2013.01)

(58) Field of Classification Search
None
See application file for complete search history.

(56) References Cited

U.S. PATENT DOCUMENTS 5,319,543 A * 6/1994 Wilhelm ................ G06Q 10/10 705/3
2018/0047554 A1* 2/2018 Takats .................... A61B 10/00
2020/0385296 A1* 12/2020 Garcia .................. G05D 21/02

FOREIGN PATENT DOCUMENTS

CN 201395237 Y 2/2010
CN 202297198 U 7/2012
(Continued)

OTHER PUBLICATIONS

Hamouda et al., "Wastewater surveillance for SARS-CoV-2: Lessons learnt from recent studies to define future applications," Science of The Total Environment, 759(143493): 1-19 (2021).
(Continued)

*Primary Examiner* — Matthew D Krcha
(74) *Attorney, Agent, or Firm* — Morgan, Lewis & Bockius LLP

(57) ABSTRACT

The present disclosure provides a test method for assessing the possibility of infection of residents without performing periodic PCR tests of residents of a facility in question. One embodiment is an infectious disease test method that includes a sampling step for collecting a sample from sewage during a sampling period in a route from where sewage is discharged from a facility until flowing into a public sewage pipe, an analysis step for analyzing the sample to obtain information relating to the existence of an infectious disease pathogen in the sample, and a notification step for notifying the facility of the information together with the sampling period.

14 Claims, 3 Drawing Sheets

(56) References Cited

FOREIGN PATENT DOCUMENTS

| | | | |
|---|---|---|---|
| CN | 111444279 | A | 7/2020 |
| JP | H11-256543 | A | 9/1999 |
| JP | 2011-155919 | A | 8/2011 |

OTHER PUBLICATIONS

Extended European Search Report dated Aug. 12, 2024, issued in corresponding European Patent Application No. 21933168.3.

Tanaka et al., "Development of novel coronavirus monitoring methods through industry-academia collaboration," The Graduate School of Engineering, Kyoto University, Appendix 5 <<https://www.city.kyoto.lg.Jp/gyozai/cmsfiles/contents/0000267/267621/0303180500sangakurenkei.pdf>>(2021).

Notice of Allowance issued in corresponding Japanese Patent Application No. 2021-568917 dated Jan. 25, 2022.

First Office Action issued in corresponding Japanese Patent Application No. 2022-024052 dated Apr. 5, 2022.

Notice of Allowance issued in corresponding Japanese Patent Application No. 2022-024052 dated Jun. 21, 2022.

Written Opinion of the International Searching Authority issued in corresponding International Patent Application No. PCT/JP2021/023270 dated Aug. 31, 2021.

International Search Report issued in corresponding International Patent Application No. PCT/JP2021/023270 dated Aug. 31, 2021.

Office Action issued in corresponding Australian Patent Application No. 2021436402, dated Feb. 21, 2025.

Hart et al., "Computational analysis of SARS-CoV-2/COVID-19 surveillance by wastewater-based epidemiology locally and globally: Feasibility, economy, opportunities and challenges", Science of the Total Environment, vol. 730, 2020, pp. 1-9.

Hasan et al., "Detection and quantification of SARS-CoV-2 RNA in wastewater and treated effluents: Surveillance of COVID-19 epidemic in the United Arab Emirates", Science of the Total Environment, vol. 764, 2021, pp. 1-10.

Office Action issued in corresponding Indian Patent Application No. 202317072300, dated Feb. 9, 2026.

Office Action issued in corresponding Japanese Patent Application No. 2024-191592, dated Jun. 2, 2026.

Kitajima et al., "Detection of SARS-CoV-2 in the Sewage of a Nursing Home for Persons with Mild Disease in COVID-19: Verification of the Epidemiological Survey of Sewage in Facilities", Annual Meeting of the Japan Society for Water Environment, vol. 55, Mar. 4, 2021, p. 85.

Honda, "Tracking the Dynamics of Novel Coronavirus from Wastewater", Journal of the Japanese Society for Microbial and Biological Research, vol. 36, No. 1, Mar. 1, 2021, pp. 26-27.

Office Action issued in corresponding Japanese Patent Application No. 2024-191592, dated Dec. 23, 2025.

Office Action issued in corresponding European Patent Application No. 21933168.3, dated Jun. 16, 2026.

Office Action issued in the corresponding Chinese Patent Application No. 202180095879.0, dated Jun. 30, 2026.

* cited by examiner

[FIG. 1]
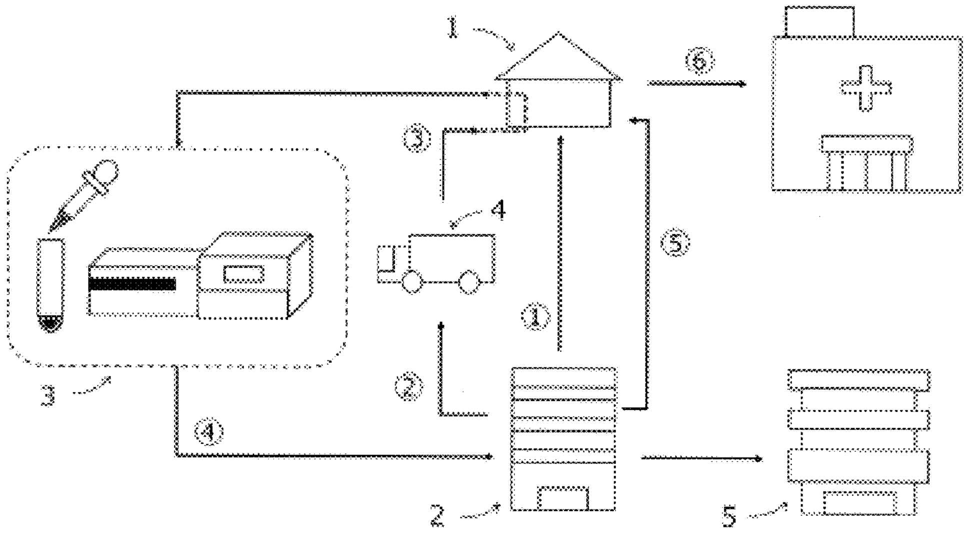
[FIG. 2]
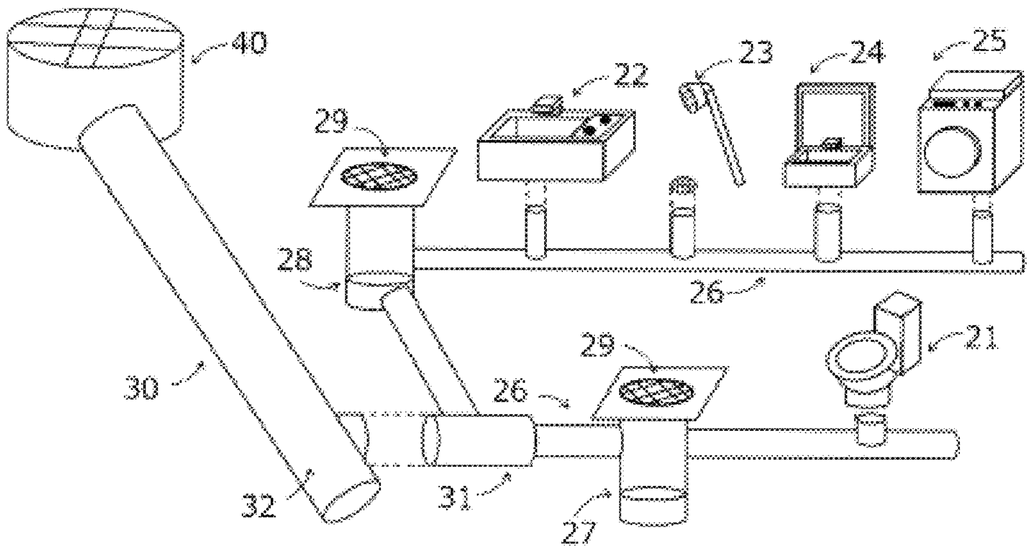

[FIG. 3]
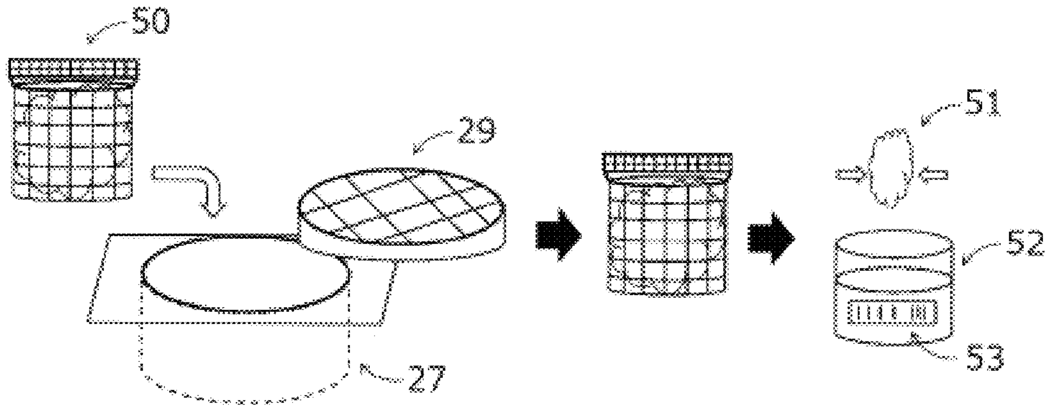
[FIG. 4]
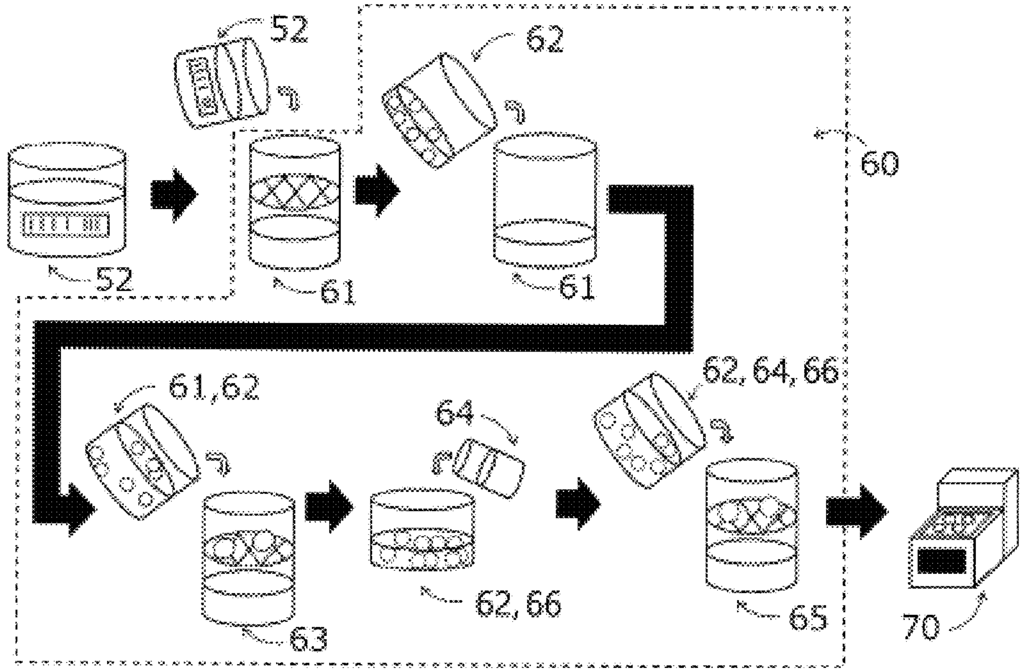

[FIG. 5]
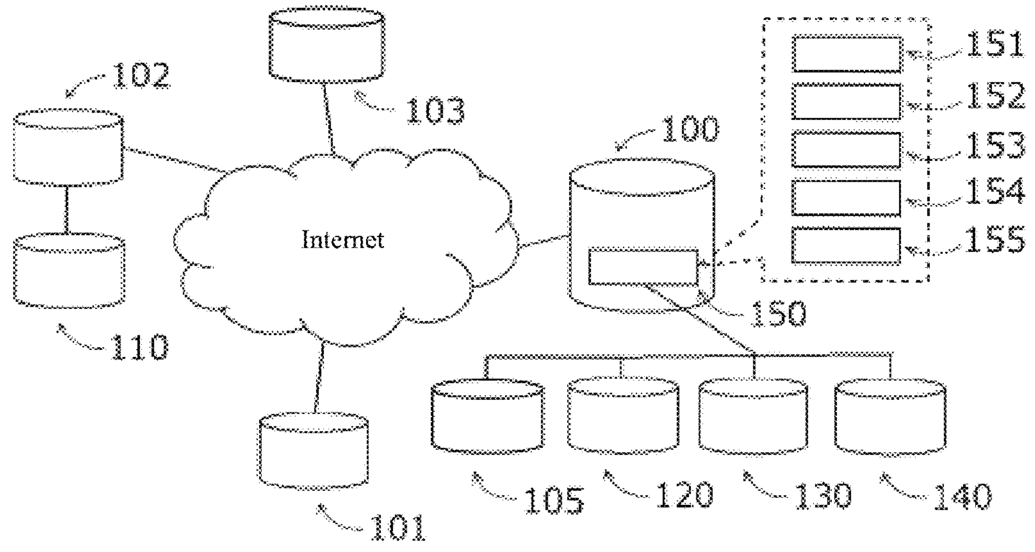

INFECTIOUS DISEASE TESTING METHOD

BACKGROUND OF THE INVENTION

Technical Field

The present invention relates to a method of testing for infectious diseases, in particular, an infectious disease testing method for preventing the occurrence of clusters (outbreaks) in facilities using the natural law of uneven distribution of infectious pathogens such as viruses in city settings, and the like.

Background Art

To prevent the spread of infectious diseases such as COVID-19, and the like, infectious disease tests (and other antigen tests, and the like), as represented by PCR tests, that are able to confirm infection at the time of testing are performed on people showing symptoms, such as temperatures, or the like, and measures, including isolating those who have been in close contact with infected persons, are taken when positive reactions occur.

However, there is a problem when infected persons are found among persons living in groups in hospitals and long-term care facilities, and the like, in that, by the time symptoms are confirmed and PCR tests come up positive, infections have already spread and clusters have occurred. Thus, while it is possible to conduct regular PCR tests on asymptomatic persons, doing so is quite costly and time consuming, and thus there are few facilities that implement PCR tests on all residents. Accordingly, clusters are occurring on a regular basis.

Meanwhile, attempts are being made to extrapolate infectious diseases such as norovirus, and the like, by analyzing sewage collected from sewage treatment plants in order to forecast infections on a macro scale (see, for example, Patent Document 1).

DOCUMENTS OF THE PRIOR ART

Patent Documents

Patent Document 1: Japanese Unexamined Patent Application Publication No. 2011-155919

SUMMARY OF THE INVENTION

Problem to be Solved by the Invention

An object of the present invention is to solve the problem of preventing the occurrence of infectious disease clusters by providing a testing method that determines the potential of infection of residents without performing regular PCR tests on facility residents.

Means for Solving the Problem

A mode of the present invention is an infectious disease testing method that includes; a collecting step for collecting a sample from sewage during a collecting period from a channel up to where the sewage, which is discharged from a facility, flows into a public sewer pipe; an analyzing step for analyzing the sample to obtain information relating to the presence of an infectious pathogen in the sample; and a notifying step for notifying the facility of the information and of the collecting period, where the reported information and collecting period show that a person infected with the infectious pathogen was a resident of the facility at least during the collecting period.

"Facility" as referred to here means a building such as a long-term care facility, a school, a hospital, or a company building, or the like, of one or multiple units, for which it is possible to identify major residents (employees, residents, or visitors, and the like). Furthermore, "resident" as referred to here means a concept not limited to persons (occupants) living in the facility or persons (guests) staying in the facility, but also persons (users) who use the facility only during the day. Additionally, "facility sewage" refers to sewage discharged from the facility present in a channel up to where wastewater discharged from the facility flows into a public sewer pipe.

The inventors of the present invention, based on the idea that examinations of standalone facilities where clusters occur are an effective way to understand the distribution of infectious pathogens, including viruses in city settings, flowed pseudo viruses in amounts that would be expected to be included in infected persons' excrement from toilets, and the like, in an actual facility, and then analyzed samples collected using collecting means placed in resulting sewage for just a collecting period. This resulted in the inventors being able to detect viruses in amounts sufficient for detection, and thus in the completion of the testing method according to the invention of the present case.

Note that infectious pathogens include, in addition to viruses such COVID-19, the influenza virus, and norovirus, bacteria such as *Salmonella, Mycobacterium tuberculosis*, and *E. coli* 0157, and the like, as well as microorganisms such as *Entamoeba histolytica, campylobacter*, mites, and the like.

The present invention is an invention of an infectious disease testing method for preventing the occurrence of clusters using the natural law of uneven distribution of infectious pathogens such as viruses in city settings, and the like.

Effect of the Invention

According to the present invention, an effect is demonstrated whereby a potential of a resident becoming infected can be determined, thus making it possible to suppress an occurrence of a cluster, even without performing a regular PCR test, or the like. Furthermore, by performing PCR tests on all residents in cases where infectious pathogens are discovered in a sample, a cluster can be prevented by specifically identifying an infected person.

BRIEF DESCRIPTION OF THE DRAWINGS

FIG. 1: A drawing for describing a testing method.

FIG. 2: A drawing illustrating a relationship between facility sewage and public sewage.

FIG. 3: A drawing for describing a sample collecting method.

FIG. 4: A drawing for describing a pretreatment method.

FIG. 5: A drawing illustrating a testing system.

DESCRIPTION OF THE PREFERRED EMBODIMENTS

Embodiment 1

An embodiment of the infectious disease testing method according to the present invention will be described with reference to FIG. 1.

An embodiment of the infectious disease testing method according to the present invention is performed using a facility 1, a managing company 2, a consigned analyzing company 3, a collecting business 4, and a health care center 5. Steps will be described first. Circled numbers in FIG. 1 are appropriately expressed as (Number) below.

[Step (1)]

At the request of the facility 1, the managing company 2 goes to the facility 1, investigates drainage equipment at the facility 1, and, based on the investigation, determines a collecting location and a scheduled collecting period.

[Step (2)]

The managing company 2 conveys the determined collecting location, collecting period, information for identifying a sample, and information for identifying the facility 1 to the collecting business 4, and requests the collecting of a sample.

[Step (3)]

The collecting business 4, having received this request, goes to the facility 1, collects a sample from the facility sewage during the designated collecting period at the designated collecting location, and submits the sample, along with the information for identifying the sample received at the time of the request, to the consigned analyzing company 3.

[Step (4)]

The consigned analyzing company 3, having received the submitted sample and information, analyzes the sample, obtains information relating to the presence of an infectious pathogen in the sample, and then reports that information, and the information for identifying the sample, to the managing company 2.

[Step (5)]

The managing company 2, having received this report, identifies all types of information, including information for identifying the facility 1 and information on the collecting location and the collecting period, based on the reported information for identifying the sample, and provides said information, along with information relating to the presence of an infectious pathogen in a sample, to the facility 1.

[Step (6)]

The facility 1, in receipt of this information, in cases where the information relating to the presence of an infectious pathogen in a sample indicates the presence of an infected person, identifies a resident of the facility 1 during the collecting period for which the information was submitted, and performs a PCR test on said resident.

This enables the taking of measures, such as isolation, or the like, with respect to a resident found positive, and those who have been in close contact with said resident.

The above-described Steps (1) through (6) will be described in detail below.

[Details of Step (1)]

At the request of the facility 1, the managing company 2 goes to the facility 1, investigates the drainage equipment at the facility 1, and, based on the investigation, determines a collecting location and a scheduled collecting period. Drainage equipment involved in this case will be described with reference to FIG. 2.

A toilet 21, a kitchen 22, a bathroom 23, a washroom 24, and a laundry room 25 are provided in a building of the facility 1. These are pieces of equipment able to drain sewage, but not all of them are required. Furthermore, other pieces of equipment able to drain sewage may also be provided.

Drainage generated by this equipment is discharged into a public sewer 30 through the drainage equipment.

The drainage equipment is configured of a drainage pipe 26, an excrement wastewater basin 27, a different wastewater basin 28, and a manhole cover 29 provided on each of the wastewater basins, and drainage discharged from each of these pieces of equipment is guided to a public sewer pipe 31 of the public sewer 30 through the excrement wastewater basin 27 and the different wastewater basin 28, and the like, through the drainage pipe 26. A septic tank may, but need not be, provided with the drainage equipment. Drainage guided to the public sewer pipe 31 is aggregated in a sewage treatment plant 40 through a public sewer line 32.

Preferred standards for selecting a collecting location in the facility 1 so equipped will be described. Since the excrement wastewater basin 27 and the different wastewater basin 28 are generally provided with the manhole cover 29 to make access thereto easy from above ground, these basins are preferable as a collecting location over the drainage pipe 26. Furthermore, since it is known that excrement of a resident from the toilet 21 is temporarily retained in the excrement wastewater basin 27 through the drainage pipe 26, and that an infectious pathogen of a virus, and the like, is detectable at a high concentration from excrement and phlegm, the excrement wastewater basin 27 is more preferably selected as the collecting location.

However, since there is also drainage equipment where the excrement wastewater basin 27 and the different wastewater basin 28 are integrated, where the drainage pipe 26 is accessible from the outside, or where an infectious pathogen flows into sewage by various routes, the standards for selecting the collecting location are not limited to those described above, and thus various collecting locations may be established so long as said locations are locations through which drainage mixed with an infectious pathogen released from a resident's body passes and is located before flowing into the public sewer line 32.

Preferred standards for selecting a scheduled collecting period will be described next.

For example, a large amount of water is drained from the bathroom 23 during cleaning. A timeframe when this drainage is passing through the drainage equipment is not ideal for collecting due to a low concentration of an infectious pathogen therein. Accordingly, it is preferable to interview a manager of the facility 1, and then select a timeframe other than a cleaning timeframe of the bathroom 23, and a timeframe other than a utensil cleaning timeframe of the kitchen 22, as the scheduled collecting period. Furthermore, in a case where the facility 1 is a school, or a facility dedicated to day services, wherein residents congregate during the day, it is preferable that a timeframe during the day be selected as the scheduled collecting period. Additionally, if the scheduled collecting period is too short, an opportunity for an infectious pathogen discharged from a resident's body to flow into the sewage of the facility 1 cannot be ensured, and thus it is preferable that the scheduled collecting period be set to at least several hours. However, the scheduled collecting period may be determined based on a variety of other factors, and thus so long as excrement of a resident flows into sewage and the period is sufficient for detecting an infectious pathogen from a collected sample, a variety of such scheduled collecting periods may be determined.

[Details of Step (2)]

The managing company 2 conveys the determined collecting location, scheduled collecting period, information for identifying a sample, and information for identifying the facility 1 to the collecting business 4, and requests the collecting of a sample.

In this case, the information for identifying the sample is, for example, a barcode 53 (see FIG. 3). The barcode 53 is coded with a number by which a sample scheduled for collection can be distinguished from a sample collected at a different facility or a sample collected at the same facility 1 at a different location or in a different timeframe. The information for identifying the sample does not have to be a barcode, and thus may also be an RF tag or a serial number recorded on a recording medium, or the like. Additionally, the mode of information may be changed in various ways so long as the information enables a sample scheduled for collection to be distinguished from a sample collected at a different facility or a sample collected at the same facility 1 at a different location or in a different timeframe.

Furthermore, the information for identifying the facility 1 includes, for the convenience of collecting work, a point of contact such as a telephone number, or the like, an address, and a name of a manager at the facility 1, or the like, but may also be an ID assigned to each facility individually.

Additionally, the mode of the information may be changed in various ways so long as the information enables the facility 1 to be distinguished from other facilities.

With the present embodiment the barcode 53 is affixed to surface of a collecting container 52 (see FIG. 3), upon which surface are printed required items such a name of an infectious disease targeted for testing, the name of the facility 1, and the scheduled collecting period, and the like, and the collecting container 52 is sent to the collecting business 4. Thus, information can be conveyed properly simply by looking at the collecting container 52. However, these items may also be described by, in addition to the collecting container 52, submitting a paper document on which the items have been printed, or by being conveyed to the collecting business 4 using digitized data. The collecting container 52 may also be prepared by the collecting business 4. Additionally, the mode thereof may be changed in various ways so long as the determined collecting location, scheduled collecting period, information for identifying the sample, and information for identifying the facility 1 are conveyed to the collecting business 4.

[Details of Step (3)]

The collecting business 4, having received this request, goes to the facility 1, collects a sample from the facility sewage during the designated scheduled collecting period at the designated collecting location, and submits the sample, along with the information for identifying the sample received at the time of the request, to the consigned analyzing company 3. The method for collecting the sample will be described with reference to FIG. 3.

The collecting business 4, having arrived at the facility 1, based on collecting location information, for example, opens the manhole cover 29, and then permeates a sample collecting absorber 51 included in a sampling kit 50 with sewage in the excrement wastewater basin 27. The sampling kit 50 is structured so that the sample collecting absorber 51 is wrapped in a net, and the kit is set in a place, or the like, directly below the manhole cover 29 by being hung from a string-like body not illustrated in the figure. Hanging by a string-like body ensures that, even when exposed for long periods to debris, such as toilet paper which often flows in sewage, the sampling kit 50 is shaken by collisions with the debris, thus keeping the kit from being covered with the debris, and allowing the efficient collection of a pathogen. The string-like body may be configured of, for example, a wire net, may be secured in a placement location using a load-tightening belt, or the like, attached to the wire net, and provided with an adjusting buckle, which will, in such cases, make height adjustments easy. The string-like body may be secured in various locations, so long as the sampling kit 50 can be shaken through the tension created by securing the string-like body. In terms of easy sampling kit 50 recovery, the manhole cover 29, or the like, makes a suitable securing location.

This mode is continued for exactly a scheduled collecting period, and the sample collecting absorber 51 is withdrawn from the wastewater basin 27 after the scheduled collecting period has passed. After that, the sample collecting absorber 51 is wrung out, and a liquid sample is extracted into the collecting container 52. It is preferable that the barcode 53 be affixed to the collecting container 52 at this time. The sample collecting absorber 51 is an absorber such as a polymer, an absorbent cotton, or the like, placed in a bag-shaped net, absorbs wastewater during the collecting period, catches matter flushed irregularly from the toilet 21, and is able to detect an infectious pathogen without being affected by time fluctuations.

At this time, a period from actual start of collecting until withdrawal, is noted on the collecting container 52 as the collecting period, and the container is submitted to the consigned analyzing company 3. In this way, the information for identifying the sample and collecting period are conveyed to the consigned analyzing company 3 along with the collected sample.

Although the barcode 53 was used as the information for identifying the sample in the present embodiment, so long as the sample can be identified, the information may be just a serial number, a symbol, or other form of ID, or even a letter than links to the name of the facility 1 and the collecting period. Other various types of information may be used so long as the sample can be distinguished from one collected at a different facility or during a different timeframe. Furthermore, the collecting period may be conveyed to the managing company 2 instead of the consigned analyzing company 3. Additionally, a method for expressing the period may include both the date and time collecting started and the date and time collecting ended, or the period may be expressed as the date and time collecting started and the length of time collecting lasted. So long as the period during which the sample was collected can be identified, the mode of the method may be changed in various ways.

[Details of Step (4)]

The consigned analyzing company 3, having received the submitted sample and information, analyzes the sample, obtains information relating to the presence of an infectious pathogen in the sample, and then reports that information, and the information for identifying the sample, to the managing company 2.

After pretreating the sample in the collecting container 52, the consigned analyzing company 3 performs an infectious disease testing method (as well as an antigen test, or the like) that is able to confirm an infection as of the time of a test such as, for example, a known PCR test, or the like. The pretreatment procedure will be described with reference to FIG. 4.

The pretreatment according to the present embodiment uses a pretreating kit 60 equipped with a first filtering container 61, antibody beads 62, a second filtering container 63, an enzyme 64, and a third filtering container 65.

The pretreatment procedure according to the present embodiment is roughly as described below.

Relatively large debris is removed by passing the sample in the collecting container 52 through the first filtering container 61.

The antibody beads 62 are added to a resulting filtrate, which is then stirred. Commercially available antibody beads with an antibody for selectively capturing an infectious pathogen to be detected secured to bead surfaces may be used as the antibody beads 62.

After stirring, the filtrate containing the antibody beads 62 is poured into the second filtering container 63 to extract the antibody beads 62.

The extracted antibody beads 62 are mixed with a pure water 66, or the like, into which the enzyme 64 is introduced. The enzyme 64 selectively severs a portion of the antibody in order to sever and release the antibody from the beads.

Then, an infectious pathogen released from the beads through the severing of the antibody is introduced into the third filtering container 65 in order to separate the pathogen from the antibody beads 62. After that, a resulting filtrate is detected using a known infectious pathogen detecting kit 70, that is, for example, a PCR test kit.

Although a specimen was pretreated using the pretreating kit 60 in the present embodiment, in some cases, treatment can be completed using only the infectious pathogen detecting kit 70 in a later stage. Furthermore, a kit using, for example, PCR or the Enzyme-Linked Immuno Sorbent Assay (ELISA) may be used as the infectious pathogen detecting kit 70. Moreover, an infectious pathogen may be detected using an analyzing device that combines liquid chromatography such as LCMS, or the like, with a mass spectrometer. Furthermore, it is not necessarily required to use the pretreating kit 60 or the infectious pathogen detecting kit 70, as described above, to pretreat a specimen and then detect an infectious pathogen. Additionally, the mode of pretreatment may be changed in various was so long as an infectious pathogen can be detected.

The consigned analyzing company 3 reports numerical information on the barcode 53 as information for identifying a sample, and the presence/absence of detection and amount of infectious pathogen present per specimen liter as infectious pathogen detection results to the managing company 2.

The infectious pathogen detection results may be either simply the presence/absence of detection or a level notation expressing discretized abundance. Additionally, the mode thereof may be changed in various ways so long as the information provided makes it possible to determine the presence of an infected person.

[Details of Step (5)]

The managing company 2, having received this report, identifies all types of information, including information for identifying the facility 1 and information on the collecting location and the collecting period, based on the reported information for identifying a sample, and provides said information, along with information relating to the presence of an infectious pathogen in a sample, to the facility 1.

Although the collecting location information is not necessarily required in such cases, the actual collecting period information is required for identification of potentially infected residents as described below.

Additionally, because the managing company 2 contributes to keeping track of an infected person, and managing a stockpile of test kits such as PCR tests, and the like, in an area, the company may report relevant results to the health care center 5. In such cases, the company must obtain approval from a manager of the facility 1 before providing such reports to the health care center 5.

[Details of Step (6)]

The facility 1, in receipt of this information, in cases where the information relating to the presence of an infectious pathogen in a sample indicates the presence of an infected person, identifies a resident of the facility 1 during the collecting period for which the information was submitted, and performs a PCR test on said resident.

At this time, since it is possible that resident excrement, and the like, may have been included in facility sewage from before this collecting period, it is preferable that the collecting period be compared to resident residence periods retroactively back to a period when a large volume drainage action was last performed, such as, for example, when the bathroom 23 was last cleaned or the kitchen 22 was last used, or the like. However, the method of comparison may be changed in various ways so long as residents included in residence periods in some timeframes, at least during the collecting period, can be identified.

This enables the taking of measures, such as isolation, or the like, with respect to a resident found positive, and those who have been in close contact with said resident.

Note that the facility 1 may consign resident identification to the managing company 2. In such cases, entering entry/exit information and a personal ID in a ledger for managing entry/exit at the facility 1 and making a list containing this information viewable to the managing company 2, will enable the managing company 2 to compare a residence period to the collecting period, and report results to the facility 1. Thus, management is made simple because the manager of the facility 1 need only recommend, and make preparations for, a PCR test for a resident that corresponds to a reported personal ID. Since only an ID is exchanged, it is preferable that it be possible to prevent personal information from leaking to the management company 2 from the facility 1.

Embodiment 2

A web-based system that simplifies the above embodiment will be described.

The web-based system according to the present embodiment, as is illustrated in FIG. 5, is configured of a managing server 100; a collecting business terminal 101; a facility terminal 102; a consigned analyzing business terminal 103; a facility DB 105, collecting plan DB 120, collecting results DB 130, and analysis results DB 140, as databases stored on the cloud; and a program 150 that runs on the managing server 100. The collecting business terminal 101, facility terminal 102, and consigned analyzing business terminal 103 are able to access the managing server 100 through an Internet line. Furthermore, the managing server 100 is configured to be able to access the databases 105, 120, 130, and 140. The program 150 is either a web server program that issues HTML, sources, an ASP program that runs on a server, or a combination thereof, and is configured to be able to access the above databases.

Additionally, the facility terminal 102 is configured to be able to access a resident DB 110, which is a database stored on a separate storage.

<Description of Each Database>

The resident DB 110 is a database with fields for a facility ID, a resident ID, a resident name, a residence period, and a PCR test history.

The facility DB 105 is a database with fields for a facility ID, a facility name, a password, and contact information (a facility address, telephone number, manager name, and the like).

The collecting plan DB 120 is a database with fields for a collection request ID, a requested pathogen type, investigating facility information, investigation requester information, a scheduled collected specimen placement time, a scheduled collected specimen recovery time, a scheduled collecting date, scheduled collecting location information, and collection requesting business information.

Furthermore, the collecting results DB 130 is a database with fields for a collected sample ID, a collection request ID, a collecting business ID, and an actual collecting period.

Additionally, the analysis results DB 140 is a database with fields for a pathogen detection value, infection possibility judgment results, an analysis request date, an analysis results report date, and an analyst ID.

<Description of the Program 150>

The configuration of the program 150 will be described next. The program 150 is, broadly speaking, configured of a facility managing program 151, an order managing program 152, a collection managing program 153, an analysis managing program 154, and a test results managing program 155.

The operation of each program that configures the program 150 will be described.

<Description of the Facility Managing Program 151>

The facility managing program 151 displays a web page for accepting new registrations for the facility 1 on an access destination terminal, for example, the facility terminal 102. Accessing the web page from the facility terminal 102, or the like, enables input of a facility name, a password, contact information, and the like, which are registered in the facility DB 105 along with a newly assigned facility ID. The address, telephone number, manager name, and the like, of the facility 1 are registered under the contact information.

<Description of the Order Managing Program 152>

The order managing program 152 displays a web page for accepting requests from the facility 1 on an access destination terminal, for example, the facility terminal 102. Accessing the web page from the facility terminal 102, or the like, displays a login screen and accepts input of a facility ID and a password. At that time, the facility ID and password are compared with data in the facility DB 105, and, when verification is successful, a new requests page displays.

When a new request is input on the new requests page, the collection request ID is given a new number, the facility ID is stored in the investigating facility information, the contact information is stored in the investigation requester information, and the information is registered in the collecting plan DB 120.

The order managing program 152 displays a managers web page when there is a login using the ID of a different manager.

The telephone number, address, and manager name of the facility 1 from the facility DB 105 display on the managers web page based on contact information about the newly accepted collection request ID stored in the investigation requester information. A manager at the managing company 2 uses this web page to phone, or the like, the facility 1, set a visit date/time, visit the facility 1 based on an address and manager name, and register requested pathogen type, investigation requester information, scheduled collected specimen placement time, scheduled collected specimen recovery time, scheduled collecting date, scheduled collecting location information, collection requesting business information, and the like, in the collecting plan DB 120 based on interviews during the visit.

This enables execution of the collecting planning step (Step (1) in FIG. 1).

<Description of the Collection Managing Program 153>

The collection managing program 153 displays a collecting business web page that is accessed from the collecting business terminal 101. Logging onto this web page using a collecting business ID displays a list of those cases registered in the collecting plan DB 120 that are not yet registered in the collecting results DB 130 and a consignment button corresponding to each such case.

Clicking the consignment button registers a selected collection request ID and collecting business ID along with a collected sample ID to be newly and automatically numbered in the collecting results DB 130. A number for the collected sample ID and the barcode 53 corresponding thereto, which can be printed, are displayed on the page. The collecting business 4 prints these on a sticker, or the like, and then affixes the sticker to the collecting container 52. The collecting business takes the collecting container 52 and the sample collecting absorber 51, executes the sample collecting step (Step (3) in FIG. 1), and inputs the actual collecting period on the web page, which is thus registered in the collecting results DB 130.

Note that although Step (2) (requesting step) in FIG. 1 can be performed automatically by this web-based system, when the managing company 2 is responsible for this requesting step, the managing company 2 may access the web page, assign a collecting business ID individually, and report this to the collecting business 4.

<Description of the Analysis Managing Program 154>

The analysis managing program 154 displays a consigned analyzing business web page that is accessed from the consigned analyzing business terminal 103. Logging onto this web page using a consignee ID displays a screen for inputting the collected sample ID. Either scanning the barcode 53 affixed to the collecting container 52 accepted from the collecting business using a barcode reader, or inputting the disclosed collected sample ID using a keyboard, on this screen reads a corresponding collection request ID from the collecting results DB 130 and a requested pathogen type corresponding to the collection request ID from the collecting plan DB 120, which are displayed on the web page, and accepts the pathogen detection value, infection possibility judgment results, analysis request date, analysis results report date, and analyst ID input.

A consigned analyzing business 5 executes a pathogen analyzing step (Step (4) in FIG. 1) based on the requested pathogen type, and appropriately inputs the above accepted input items, which are thus registered in the analysis results DB 140.

The managing company 2 confirms the contents of the analysis results DB 140, and executes Step (5) in FIG. 1 by reporting results to the facility 1.

<Description of the Test Results Managing Program 155>

The test results managing program 155 executes on the facility terminal 102. When the test results managing program 155 is run from the facility terminal 102, the test results managing program 155 accepts input of a facility ID and password from the facility terminal 102. Then, the input facility ID and password are compared against data in the facility DB 105, and, when verification is successful, analysis results corresponding to the verified facility ID are read from the analysis results DB 140 and sent to the facility terminal 102. A manager of the facility 1 references the infection possibility judgment results with the most recent analysis results report date among the analysis results from the analysis results DB 140, and, when the infection possibility judgment results show the presence of an infected person, extracts a resident ID for which the actual collecting period in the collecting results DB 130 and the residence period in the resident DB 110 overlap, and then displays a list disclosing resident name, residence period, and PCR test history on the screen of the facility terminal 102.

The manager of the facility 1 then submits the list to the health care center 5 and requests a PCR test from a hospital, or the like.

The manager adds and inputs the PCR test results to the PCR test history, and registers the results in the resident DB 110.

In this way, a cluster can be prevented simply by giving individual infectious disease tests to a minimum of residents only when necessary.

Note that although the test results managing program 155 is run on the facility terminal 102 in the present embodiment, the program may be run on the managing server 100 and displayed on the facility terminal 102 as a web page. In such cases, the leak of personal information can be prevented by making it impossible to access any field that makes it possible to identify an individual in the resident DB 110 from the managing server 100.

The present invention is not limited to the examples described above, and thus the embodiments can be modified to an extent familiar to one skilled in the art.

VARIOUS MODES

The illustrative embodiments described above will be understood by one skilled in the art as being specific examples of the following modes.

(Item 1) The infectious disease testing method according to one mode of the present invention includes;

a collecting step for collecting a sample from sewage during a collecting period from a channel up to where the sewage, which is discharged from a facility, flows into a public sewer pipe;

an analyzing step for analyzing the sample to obtain information relating to the presence of an infectious pathogen in the sample; and a notifying step for notifying the facility of the information and of the collecting period, wherein the reported information and collecting period show that a person infected with the infectious pathogen was a resident of the facility at least during the collecting period.

(Item 2) In the infectious disease testing method disclosed in Item 1;

the collecting step may collect a sample from a wastewater basin into which drainage, within the facility sewage, flows from a toilet in the facility.

(Item 3) The infectious disease testing method disclosed in Item 1;

may include, prior to the collecting step, a collecting planning step for identifying, within the facility sewage, a location where the sample should be collected and/or the collecting period for collecting the sample.

(Item 4) In the infectious disease testing method disclosed in Item 1;

in the collecting step, a sampling absorber may be recovered after being detained in the facility sewage, and a substance retained in the absorber recovered as the sample.

(Item 5) In the infectious disease testing method disclosed in Item 1;

when the information shows that a person infected with the infection pathogen may have been among the residents of the facility at least during the collecting period, at least some of those who were residents of the facility during the collecting period may be tested for infection by the infectious pathogen.

(Item 6) The infectious disease managing system according to one mode of the present invention includes;

a collection results database that stores a sample collected from sewage in a channel up to where the sewage, which is discharged from a facility, flows into a public sewer pipe during a collecting period in association with the collecting period and the information for identifying the sample;

an analysis results database that stores, together with information for identifying the sample, information relating to the presence of an infectious pathogen in the sample, which information was obtained by analyzing the sample;

a resident database for recording information that identifies a resident in the facility, together with a period during which said resident resided in the facility; and a computer program able to access each of these databases, wherein the computer program is able to, when information relating to the presence of an infectious pathogen in the sample shows that a person infected with the infectious pathogen may have been among the residents of the facility at least during the collecting period, extract a list of said residents whose periods of residences in the facility overlap the collecting period based on the data stored in each of the databases.

(Item 7) The infectious disease managing system disclosed in Item 6 includes;

a facility database for storing information that identifies the facility, wherein the information that identifies the facility includes a login ID and a password, and the computer program may include input accepting means for accepting input of the login ID and the password, means for verifying the login ID and password, and display means for displaying, with respect to the facility corresponding to the verified login ID and password, information relating to the presence of an infectious pathogen in the sample and a list of the residents.

BRIEF DESCRIPTION OF THE REFERENCE NUMERALS

1 . . . Facility
2 . . . Managing company
3 . . . Consigned analyzing company
4 . . . Collecting business
5 . . . Health care center
21 . . . Toilet
22 . . . Kitchen
23 . . . Bathroom
24 . . . Washroom
25 . . . Laundry room
26 . . . Drainage pipe
27 . . . Excrement wastewater basin
28 . . . Different wastewater basin
29 . . . Manhole cover
30 . . . Public sewer facility
31 . . . Public sewer pipe
32 . . . Public sewer line
40 . . . Sewage treatment plant
50 . . . Sampling kit
51 . . . Sample collecting absorber
52 . . . Collecting container
53 . . . Barcode
60 . . . Pretreating kit
61 . . . First filtering container
62 . . . Antibody beads
63 . . . Second filtering container
64 . . . Enzyme
65 . . . Third filtering container

70 . . . Infectious pathogen detecting kit
100 . . . Managing server
101 . . . Collecting business terminal
102 . . . Facility terminal
103 . . . Consigned analyzing business terminal
105 . . . Facility DB
110 . . . Resident DB
120 . . . Collecting plan DB
130 . . . Collecting results DB
140 . . . Analysis results DB
150 . . . Program
151 . . . Facility managing program
152 . . . Order managing program
153 . . . Collection managing program
154 . . . Analysis managing program
155 . . . Test results managing program

The invention claimed is:

1. An infectious disease testing method comprising:

collecting a sample from a sewage during a collecting period from a channel up to where the sewage, which is discharged from a facility, flows into a public sewer pipe;

analyzing the collected sample to obtain information relating to a presence of an infectious pathogen in the sample; and notifying the facility of the information and of an actual collecting period representing a period from an actual beginning to an end of the collecting the sample, wherein the information and the actual collecting period show that an infected person with the infectious pathogen was a resident of the facility at least during the actual collecting period.

2. The infectious disease testing method according to claim 1, wherein the sample is collected from a wastewater basin into which drainage, within the facility sewage, flows from a toilet in the facility.

3. The infectious disease testing method according to claim 1, further comprising:

identifying, within the facility sewage, a collecting location where the sample should be collected and/or the collecting period.

4. The infectious disease testing method according to claim 1, wherein a sampling absorber used for collecting the sample is recovered after being detained in the sewage, and a substance retained in the sampling absorber is recovered as the sample.

5. The infectious disease testing method according to claim 4, wherein the absorber comprises a polymer or an absorbent cotton.

6. The infectious disease testing method according to claim 1, further comprising:

when the information and the actual collecting period shows that the infected person was a resident of the facility during the actual collecting period, comparing the actual collecting period to each residence period of each resident of the facility;

identifying at least some of residents having residence periods which overlap to the actual collecting period, wherein the identified at least some of residents are tested.

7. The infectious disease testing method according to claim 1, further comprising:

when the information and the actual collecting period shows that the infected person was a resident of the facility during the actual collecting period, comparing the actual collecting period to each residence period of each resident of the facility;

identifying at least some of residents having residence periods which overlap to the actual collecting period.

8. An infectious disease managing system comprising:

one or more databases configured to be accessed by different terminals to perform collection, analysis and recording operations associated with a potential presence of an infectious pathogen, the one or more databases including:

a collection results database that stores a sample collected from sewage in a channel up to where the sewage, which is discharged from a facility, flows into a public sewer pipe during a collecting period and the information for identifying the sample, wherein the collection results database stores an actual collecting period representing a period from an actual beginning to an end of the collecting the sample;

an analysis results database that stores, in association with information for identifying the sample, information relating to a presence of an infectious pathogen in the sample, which information was obtained by analyzing the sample;

a resident database for recording information that identifies residents in the facility, together with residence periods during which residents resided in the facility; and a facility terminal that executes a computer program, the facility terminal configured to:

access the one or more databases to:

when information relating to the presence of an infectious pathogen in the sample and the actual collecting period shows that an infected person with the infectious pathogen may have been among the residents of the facility at least during the actual collecting period, configure a list of residents associated with the presence of the infectious pathogen whose periods of residences in the facility overlap the actual collecting period based on data stored in the one or more databases.

9. The infectious disease managing system according to claim 8, wherein the one or more databases comprise a facility database for storing information that identifies the facility, the information that identifies the facility includes a login ID and a password, and the computer program provides input accepting means for accepting input of the login ID and the password, means for verifying the login ID and password, and display means for displaying, with respect to the facility corresponding to the verified login ID, information relating to the presence of an infectious pathogen in the sample and the list of the residents.

10. The infectious disease managing system according to claim 9, further comprising:

a server accessible to the one or more databases; and one or more terminals accessible to the server via a network, wherein the server includes a collection managing program executed by the server to:

display a web page to receive the information for identifying the sample and the actual collecting period from a collecting business terminal of the one or more terminals, and the server includes an analysis managing program executed by the server to:

display a web page to receive the information relating to a presence of an infectious pathogen in the collected sample from an analysis business terminal of the one or more terminals.

11. The infectious disease managing system according to claim 10, wherein the computer program is executed by the server or a facility terminal of the one or more terminals.

12. The infectious disease managing system according to claim 8, wherein the facility terminal is configured to:

retrieve, in response to execution of the computer program, the actual collecting period from the collection results database, the information relating to the presence of the infectious pathogen in the sample from the analysis results database and the residence period from the resident database;

in response to the information relating to the presence of the infectious pathogen indicating a presence of infection, compare the actual collecting period to each residence period of each resident of the facility;

identify at least some of residents having residence periods which overlap to the actual collecting period.

13. An infectious disease managing system, comprising:

one or more databases configured to be accessed by different terminals to perform collection, analysis and recording operations associated with a potential presence of an infectious pathogen;

a server accessible to the one or more databases; and a facility terminal accessible to the server via a network, the facility terminal including a computer program executed by the facility terminal to:

compare a received facility ID and password with information identifying a facility stored in the one or more database;

receive information relating to a presence of the infectious pathogen in a sample and an actual collecting period, wherein the sample is collected from a sewage during a collecting period from a channel up to where the sewage, which is discharged from a facility, flows into a public sewer pipe, the actual collecting period representing a period from an actual beginning to an end of the collecting the sample from the one or more databases; and in accordance with the information relating to the presence of the infectious pathogen in the sample and the actual collecting period representing that an infected person with the infectious pathogen was presence in the facility during the actual collecting period, configure a list of residents associated with the presence of the infectious pathogen whose residence periods overlap the actual collecting period from based on data stored in the one or more databases.

14. The infectious disease managing system according to claim 13, wherein in response to the information relating to the presence of the infectious pathogen indicating a presence of infection, the fertility terminal compares the actual collecting period to each residence period of each resident of the facility and identifies at least some of residents having residence periods which overlap to the actual collecting period.

* * * * *